United States Patent
Clancy et al.

(10) Patent No.: US 11,155,146 B2
(45) Date of Patent: Oct. 26, 2021

(54) AUTOMATED TARPING DEVICE AND SYSTEM

(71) Applicant: Valid Manufacturing Ltd., Salmon Arm (CA)

(72) Inventors: Gerald Wayne Clancy, Salmon Arm (CA); Alejandro Jose Juan, Salmon Arm (CA); Richard Johannes Robert Versteeg, Salmon Arm (CA); Steven Donald Bradwell, Salmon Arm (CA)

(73) Assignee: Valid Manufacturing Ltd., Salmon Arm (CA)

( * ) Notice: Subject to any disclaimer, the term of this patent is extended or adjusted under 35 U.S.C. 154(b) by 120 days.

(21) Appl. No.: 16/560,354

(22) Filed: Sep. 4, 2019

(65) Prior Publication Data

US 2020/0070633 A1 Mar. 5, 2020

Related U.S. Application Data

(60) Provisional application No. 62/727,350, filed on Sep. 5, 2018.

(30) Foreign Application Priority Data

Sep. 5, 2018 (CA) .............................. CA 3016533

(51) Int. Cl.
*B60J 7/08* (2006.01)
*B62D 63/08* (2006.01)
(Continued)

(52) U.S. Cl.
CPC . *B60J 7/08* (2013.01); *B60J 7/12* (2013.01); *B62D 63/08* (2013.01); *B62D 33/04* (2013.01)

(58) Field of Classification Search
CPC ..... B60J 7/12; B60J 7/08; B60J 7/1204; B60J 7/085
(Continued)

(56) References Cited

U.S. PATENT DOCUMENTS 4,218,087 A * 8/1980 Neville ..................... B60P 7/04
296/100.18
6,513,856 B1 * 2/2003 Swanson .................. B60J 7/085
296/100.15

(Continued)

OTHER PUBLICATIONS

Screen capture from YouTube video clip entitled "Autolock electric tarp", 1 page, uploaded on Mar. 27, 2014 by user Agri-Cover, Inc. Retrieved from Internet: < https://www.youtube.com/watch?v=EA80iZv1iLY>.

(Continued)

*Primary Examiner* — Jason S Morrow
(74) *Attorney, Agent, or Firm* — Antony C. Edwards

(57) ABSTRACT

An automated tarping device and system is provided, wherein the at least two swing arm devices of the tarping system are configured to be enclosed within the side walls and frame of the trailer, when the automated tarping system is in a fully closed position so as to cover the opening of the trailer with the tarp assembly. When the system is in a closed position, the swing arm devices themselves are covered by the tarp. The system also includes a tarp assembly comprising a flexible tarp and first and second resilient actuating ribs. The attaching member of each swing arm device releasably couples to an actuating rib, and the tarp and the first and second actuating ribs of the tarp assembly are transversely disposed across, so as to cover, the opening of the trailer when the arm devices are in the closed position.

16 Claims, 17 Drawing Sheets

(51) Int. Cl.
  *B60J 7/12* (2006.01)
  *B62D 33/04* (2006.01)
(58) Field of Classification Search
  USPC .................................................. 296/100.18
  See application file for complete search history.

(56) References Cited

U.S. PATENT DOCUMENTS

| | | | | |
|---|---|---|---|---|
| 8,056,955 B1* | 11/2011 | Schmeichel | ............. | B60J 7/085 296/98 |
| 8,496,283 B1* | 7/2013 | Schmeichel | ............. | B60J 7/085 296/98 |
| 10,336,168 B2* | 7/2019 | Teichrob | ................. | B60J 7/085 |
| 2002/0084672 A1* | 7/2002 | Searfoss | ................. | B60J 7/085 296/100.18 |
| 2004/0150244 A1* | 8/2004 | Eggers | .................... | B60J 7/085 296/98 |
| 2007/0236042 A1* | 10/2007 | Smith | ...................... | B60J 7/141 296/100.18 |
| 2013/0241230 A1* | 9/2013 | Knight | .................... | B60J 7/085 296/98 |
| 2013/0313855 A1* | 11/2013 | Schmeichel | ............. | B60J 7/085 296/98 |
| 2019/0077236 A1* | 3/2019 | Teichrob | ................. | B60J 7/085 |

OTHER PUBLICATIONS

Screen captures from YouTube video clip entitled "Stretch Cord Return", 1 page, uploaded on Feb. 10, 2016 by user GenuineShurCo. Retrieved from Internet: < https://www.youtube.com/watch?v=L-Un_m5P-Ul>.

Screen captures from YouTube video clip entitled "Automatische rolbache DEROO kipper", 1 page, uploaded on Sep. 15, 2014 by user Paul Deroo. Retrieved from Internet: < https://www.youtube.com/watch?v=9dkLzm6M2o8>.

Screen captures from YouTube video clip entitled "Roll Rite", 1 page, uploaded on Feb. 19, 2015 by user Roll Rite. Retrieved from Internet: < https://www.youtube.com/watch?v=JjZCWyq2KSQ>.

Screen captures from YouTube video clip entitled "Knapen Trailers", 1 page, uploaded on Jan. 8, 2015 by user Knapen Trailers. Retrieved from Internet: <https://www.youtube.com/watch?v=ynbValaQFq8>.

Screen captures from YouTube video clip entitled "Aero Industries", 1 page, uploaded on Jan. 29, 2013 by user Aero Industries. Retrieved from Internet: <https://www.youtube.com/watch?v=BpPzbra7Ogw>.

Screen captures from YouTube video clip entitled "Deroo", 1 page, uploaded on Sep. 23, 2014 by user Paul Deroo. Retrieved from Internet: <https://www.youtube.com/watch?v=OhgEvUQ2hTk>.

Screen captures from YouTube video clip entitled "Roll-Off Container Covers", 1 page, uploaded on May 27, 2015 by user Wastequip. Retrieved from Internet: <https://www.youtube.com/watch?v=5X5mZXE9Sjk>.

Screen captures from YouTube video clip entitled "Ecotop" ,1 page, uploaded on Dec. 8, 2015 by user ecotopdk. Retrieved from Internet: <https://www.youtube.com/watch?v=ZtCvYoz1rYw>.

Screen captures from YouTube video clip entitled "Reisch Fahrzeugbau", 1 page, uploaded on Dec. 5, 2011 by user Reisch Fahrzeugbau. Retrieved from Internet: <https://www.youtube.com/watch?v=m841msGPFWc>.

Screen captures from YouTube video clip entitled "Tycrop Flip Top Tarp system", 1 page, uploaded on Feb. 11, 2014 by user Bob Fugger. Retrieved from Internet: <https://www.youtube.com/watch?v=0Y9J6Eu_v9l>.

Screen captures from YouTube video clip entitled "Sureco", 1 page, uploaded on Jul. 19, 2013 by user GenuineShurCo and Jul. 17, 2015 by user GenuineShurCo . Retrieved from Internet: <https://www.youtube.com/watch?v=oMtF6dOA_rA> and <https://www.youtube.com/watch?v=JHToZBvo1IU>.

Screen captures from YouTube video clip entitled "Kraker Trailers", 1 page, uploaded on Aug. 28, 2015 by user TTMtv. Retrieved from Internet: <https://www.youtube.com/watch?v=XYyawWMauug>.

Screen capture from YouTube video clip entitled "Hardtop", 1 page, uploaded on Feb. 27, 2017 by user Swanty32e—Machine & Truck Videos From Norway . Retrieved from Internet: <https://www.youtube.com/watch?v=zIXtqXjOu74>.

Screen capture from YouTube video clip entitled "Slide Top", 1 page, uploaded on May 15, 2012 by user Grant Whisker. Retrieved from Internet: <https://www.youtube.com/watch?v=PTpM-6v2xzM>.

Screen capture from YouTube video clip entitled "Schubbodenauflieger", 1 page, uploaded on Jun. 21, 2015 by user Ernst Riedler Fahrzeugbau u Vertriebs GmbH. Retrieved from Internet: <https://www.youtube.com/watch?v=FIVzCAa6wVU>.

Screen capture from YouTube video clip entitled "Schubboden-Sattelanhänger", 1 page, uploaded on Sep. 5, 2013 by user Wilhelm Schwarzmuller. Retrieved from Internet: <https://www.youtube.com/watch?v=uRW8SB6ihoE>.

Screen capture from YouTube video clip entitled "PEISCHL", 1 page, uploaded on May 14, 2014 by user Peischlfahrzeugtech . Retrieved from Internet: <https://www.youtube.com/watch?v=kWXTNMpYEEY>.

Image of the Sidewinder™ Tarp System. Retrieved from Internet: <https://www.shurco.com/products/donovan-brand/van-transfer-trailers/sidewinder/>.

* cited by examiner

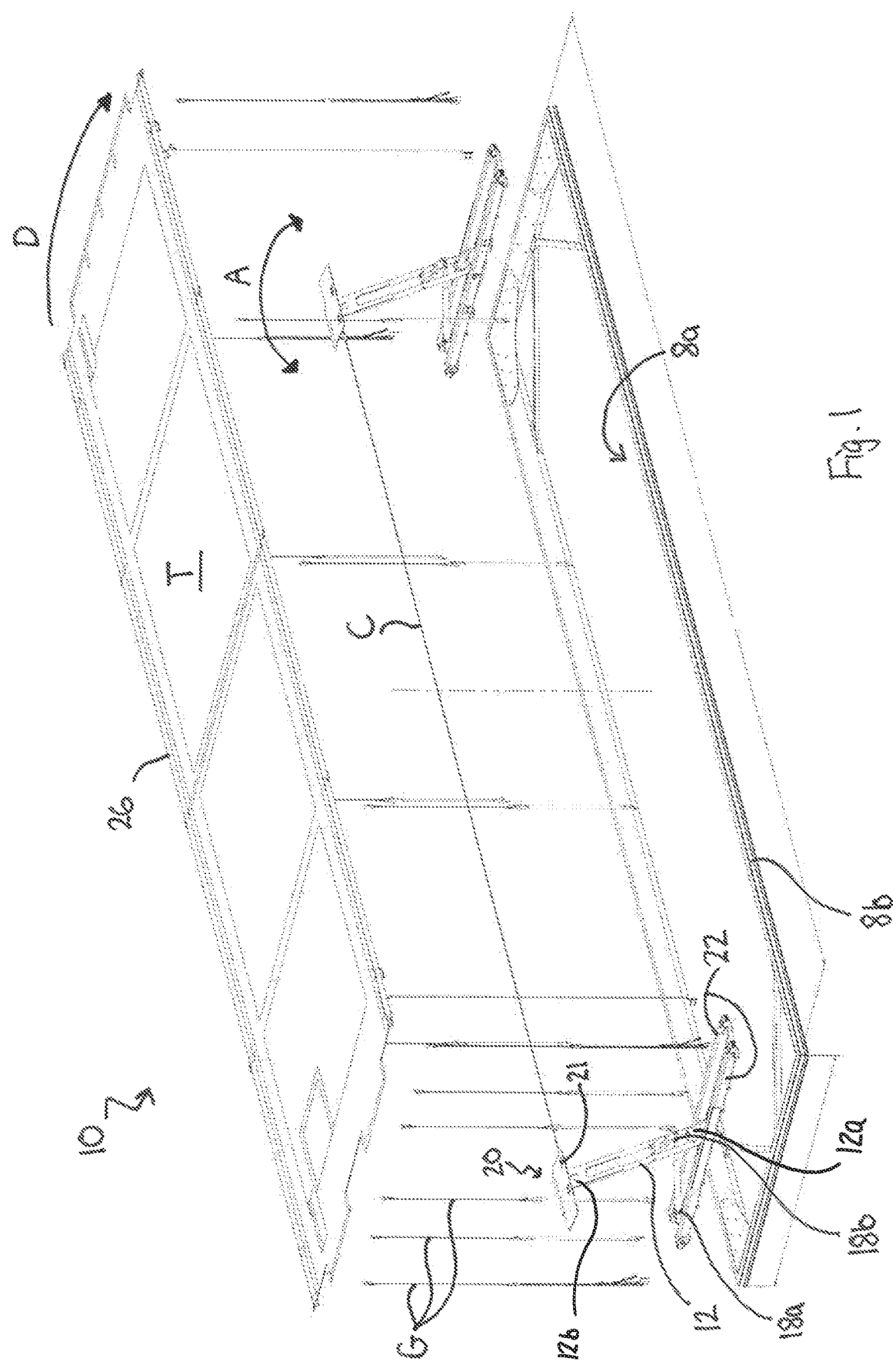

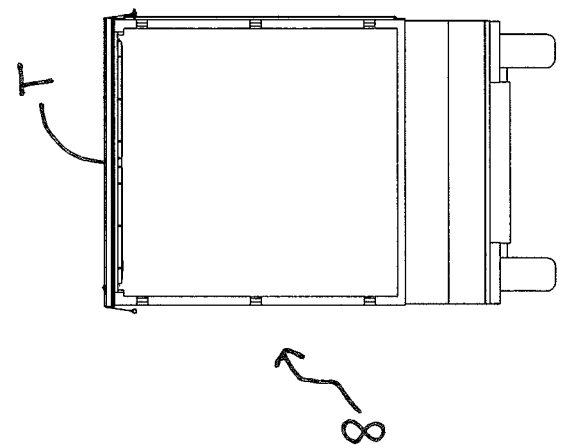
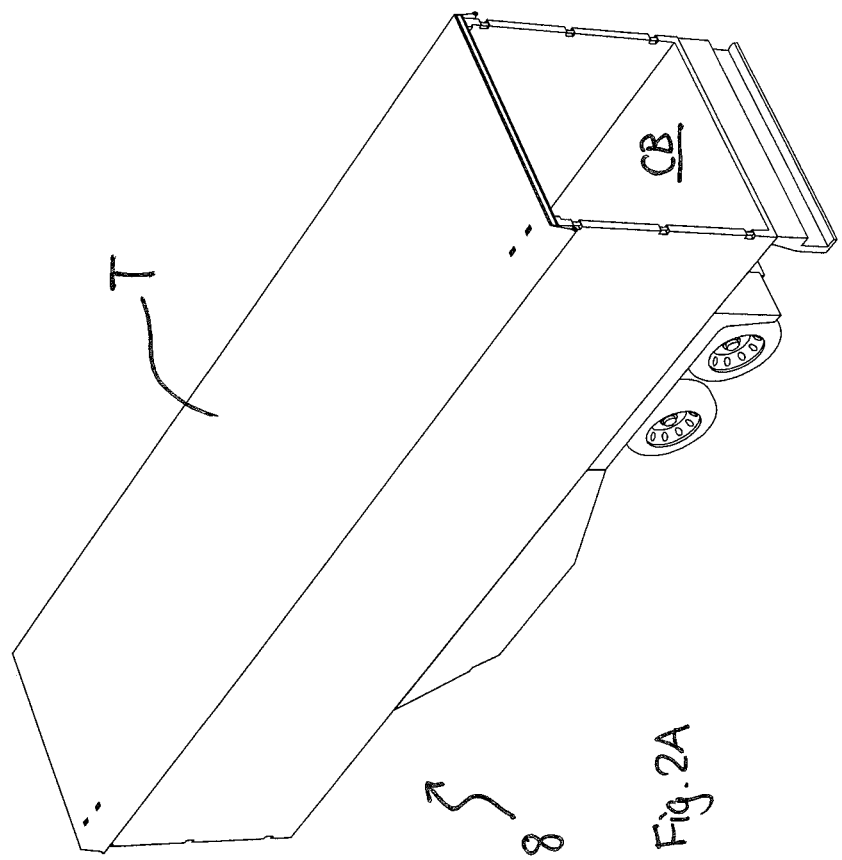

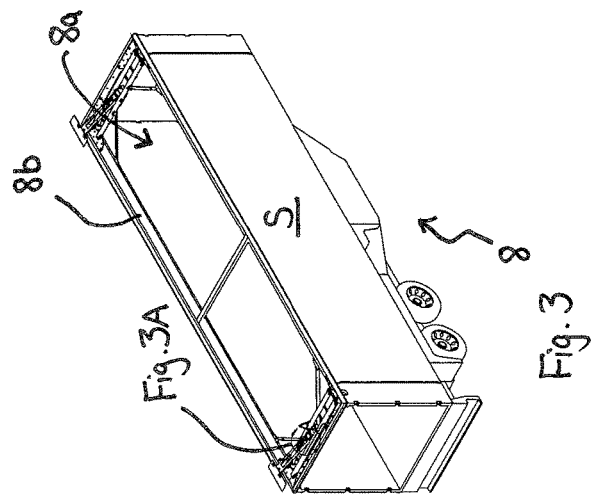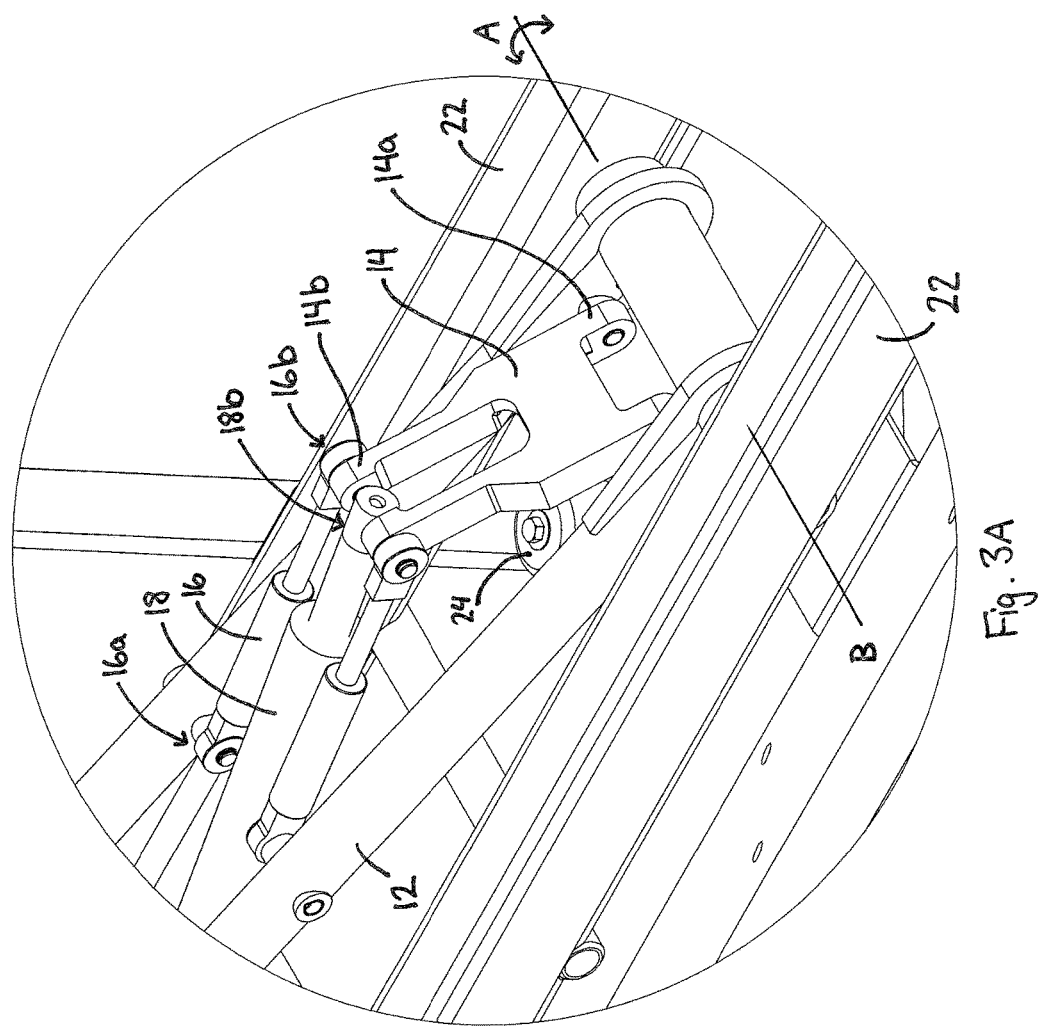

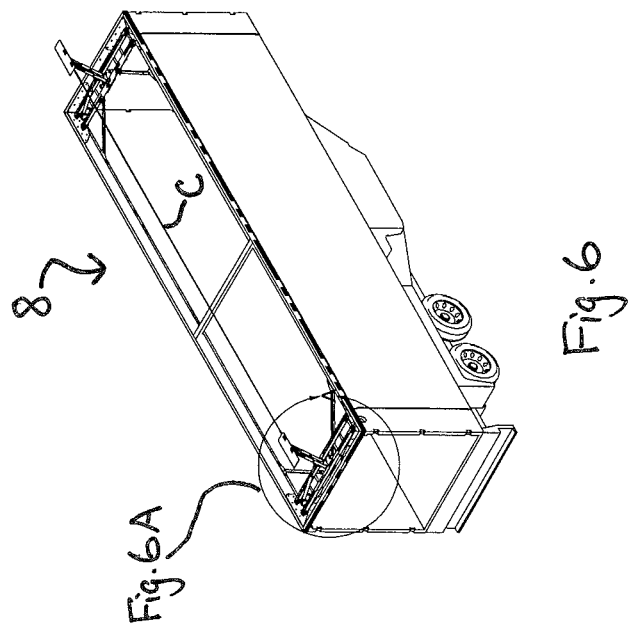
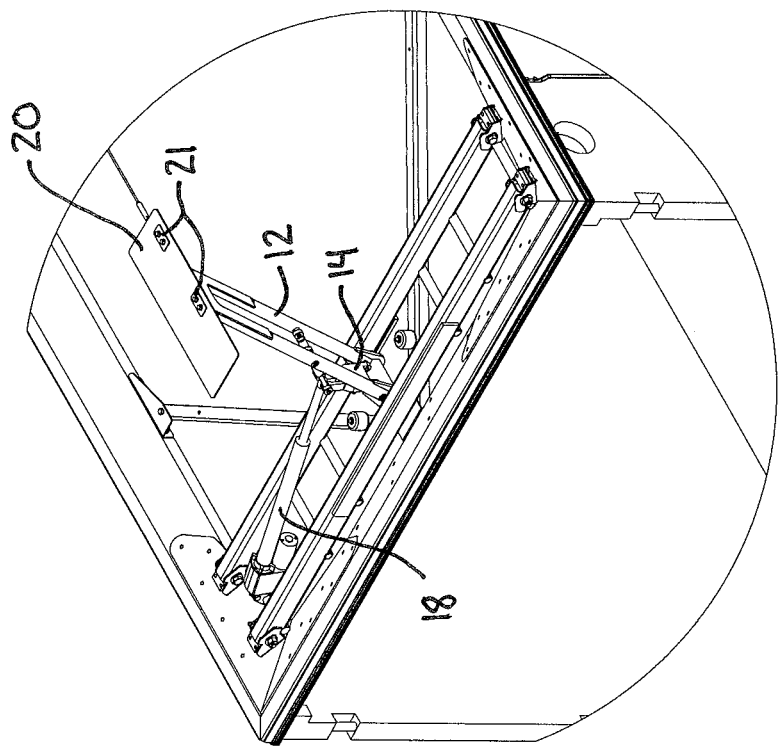

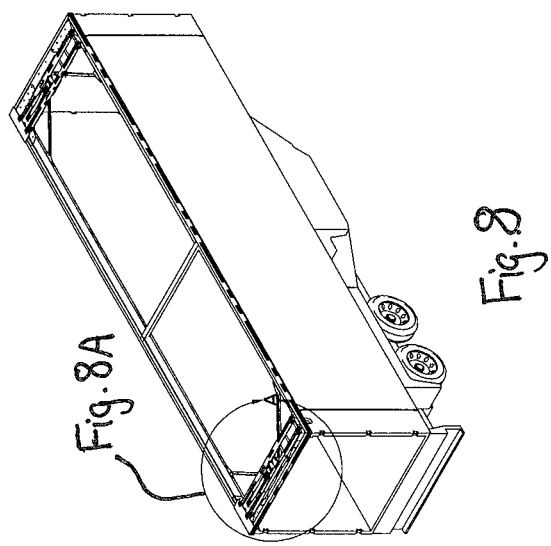
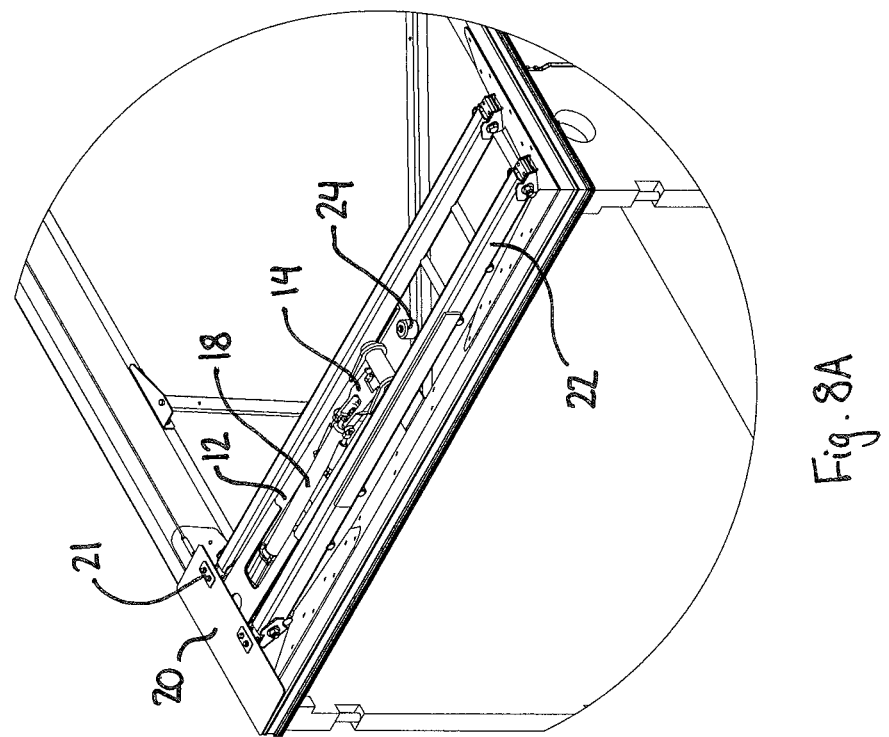

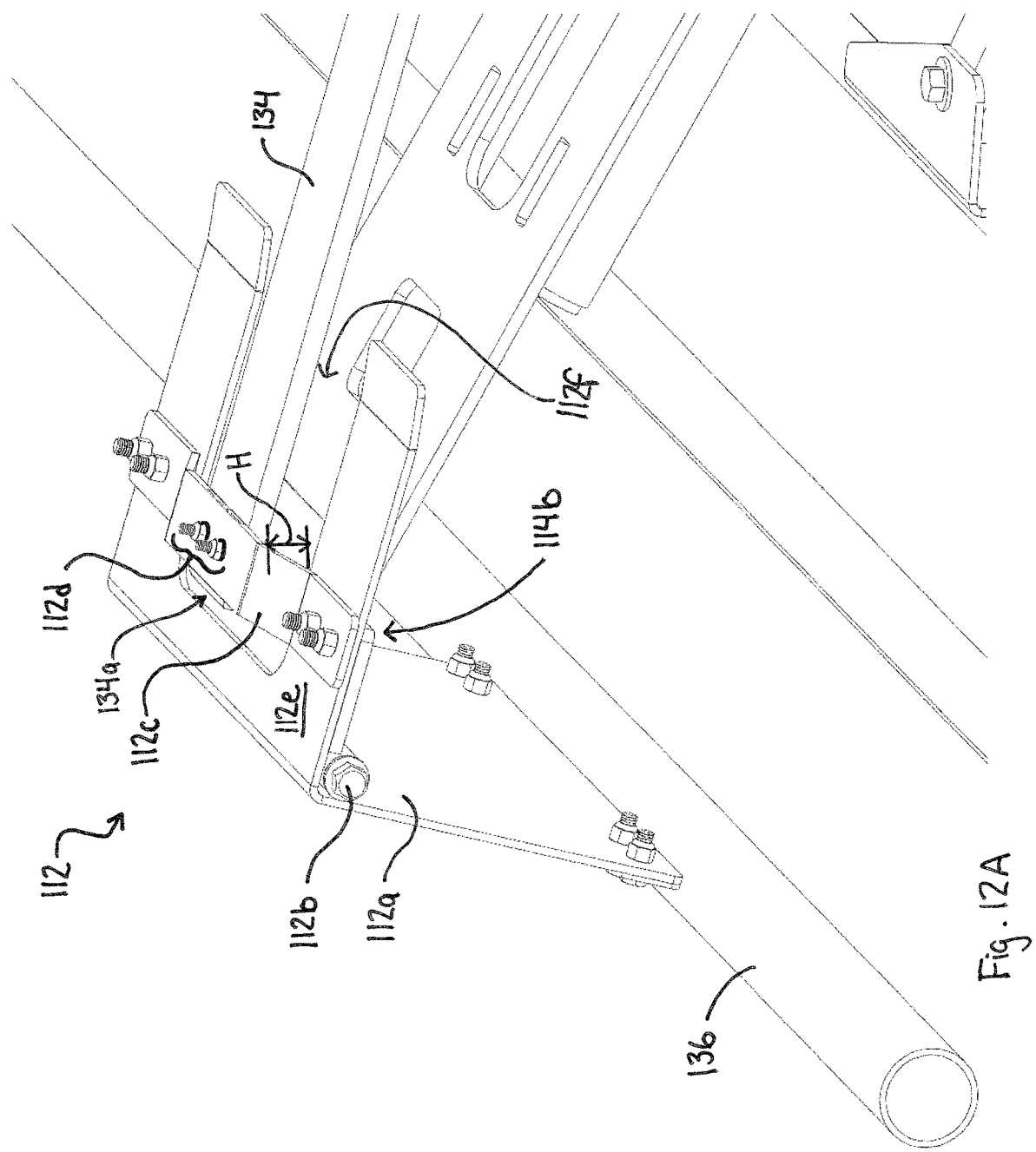

AUTOMATED TARPING DEVICE AND SYSTEM

TECHNICAL FIELD

The present application relates to an automated tarping device and system for securing the opening of a trailer with a tarp.

BACKGROUND

Trucks with open cargo beds, for example B train trailers, are commonly used to transport cargo. In order to ensure the safety of drivers and the motoring public, cargo must be secured and carriers must take steps to prevent the cargo from moving or spilling onto the roadway.

With the use of tie downs, tarps and the like are often used to manually secure the cargo, by securing the tarp over the upper opening of the trailer with the tie downs. Each tie down must be secured so that it does not come loose, unfastened, opened or released while the vehicle is moving. The driver of the vehicle must securely tighten the tie downs prior to transporting their cargo.

Manually securing cargo with a tarp and tie downs is not an easy task. Often, drivers are required to use a ladder to effectively secure the cargo. Drivers commonly transport cargo at night and in harsh weather conditions, which can increase the difficulty of the task of manually securing the cargo with a tarp and tie downs.

In prior art of which the applicant is aware, attempts have been made to solve the problem of manually securing cargo with a tarp and tie downs, by implementing automated tarping systems to tarp over the upper opening into the trailer. Applicant is aware of at least one automated tarping system which uses a pair of arms supporting a roller in-between, the roller being attached to a leading edge of the tarp so as to roll the tarp onto the roller when uncovering the trailer's opening, and to unroll the tarp over the trailer's opening to secure the cargo inside. One problem with this type of automated typing system is that it is not practical in climates where snowfall and/or ice buildup may occur, because it is difficult to roll up a tarp that is covered in snow or ice. Furthermore, rolling up a tarp covered in ice or snow may increase the thickness of the resulting, rolled up tarp, as the snow or ice buildup becomes an additional layer included in the rolled-up tarp. Another issue with this type of system is that the mechanisms, such as the arms and corresponding actuators, for rolling up the tarp are mounted to outer surfaces of the trailer walls or frame. This causes the arms and the actuators to be exposed to the elements, whether the tarp is open or closed. The exposure of the automated tarp mechanism to the elements may cause the mechanism to become encased in ice, snow, mud etc., thereby potentially interfering with the operation of the mechanism and possibly accelerating the wear and tear on the mechanism. As well, the location of the tarp-rolling mechanism on the outside of the trailer increases the overall dimensions, such as the length, width, and height, of the trailer. The problem with increasing the overall dimensions of the trailer is that road transport regulations often specify maximum dimensions of the trailer that may be transported on a public road, and because any accessories mounted to the outer surfaces of the trailer or the trailer frame are included in the overall dimension calculations of the trailer, the need to include such mechanisms on the outer surfaces of the trailer may necessitate reducing the length, width or height of the trailer and thereby reduce the overall interior volume available for cargo within the trailer.

Another automated covering, of which the applicant is aware, for covering the opening of a trailer uses a solid covering, rather than a flexible tarp. An issue with a solid covering is that when the solid covering is in an intermediate position, between a closed position and an open position, the covering may capture wind gusts as though it were a sail, thereby risking damage to the automated covering system and/or the trailer. Again, to applicant's knowledge, the actuating mechanisms are also mounted to the outer surfaces of the trailer or the trailer frame, again introducing the issues of exposing the mechanism to the elements and increasing the overall dimensions of the trailer as calculated under transportation regulations that are described above in respect of the roll-up style of automated tarping systems.

There is a need in the industry for an automated tarping system for covering the opening of a trailer, wherein the components of the automated tarping system are contained within the existing cavity of the trailer during transport of the trailer, or otherwise shielded from exposure to the elements when the tarp is in a closed position covering the opening into the trailer.

SUMMARY

In one aspect of the present disclosure, an automated tarping device and system is provided, wherein the tarping system, comprising at least two swing arm devices or assemblies, is configured so as to be enclosed within the side walls and frame of the trailer, when the automated tarping system is in a fully closed position so as to cover the opening of the trailer with a tarp. Further advantageously, when the system is in a closed position, the swing arm devices or assemblies themselves are also covered by the tarp, thereby protecting them from the weather.

In one aspect, a swing arm assembly or device for releasably securing a tarp over an opening of a trailer comprises a swing arm having a proximate end and a distal end, the proximate end of the swing arm pivotally coupled to a support beam substantially medially along a length of the beam; an attaching member coupled to the distal end of the swing arm, the attaching member adapted to releasably couple to the tarp; and an actuator having first and second ends, the first end of the actuator pivotally coupled to the support beam and the second end of the actuator operatively coupled to the swing arm between the proximate and distal ends of the swing arm. The swing arm is adapted to rotate relative to the support beam between an open position and a closed position in which the tarp is removed from or secured over, respectively, the opening of the trailer. The swing arm assembly is folded within the trailer frame when the swing arm is in the open and closed positions, and when in the closed position, the swing arm assembly is covered by the tarp.

In some embodiments, the swing arm assembly further comprises a linkage assembly, the linkage assembly having first and second ends and a hinge between the first and second ends, wherein the first end of the linkage assembly is pivotally coupled to the proximate end of the swing arm, the second end of the linkage assembly is pivotally coupled to the swing arm between the proximate and distal ends of the swing arm and the second end of the actuator is pivotally coupled to the hinge of the linkage assembly. The linkage assembly may also comprise a damper, the damper having a first end and a second end, the first end of the damper pivotally coupled to the hinge of the linkage assembly and the second end of the damper pivotally coupled to the swing arm between the distal and proximate ends of the swing arm. The damper may be, for example, an oil damper, a spring damper and/or a pneumatic damper. The actuator may be a linear actuator; for example, the actuator may include a hydraulic cylinder, an electric cylinder, a pneumatic cylinder and/or a screw drive. In other embodiments, the swing arm may include a pair of parallel swing arms.

In another aspect, the actuator of the swing arm assembly or device is a cylinder having an extended position and a retracted position, wherein the swing arm is in the open position when the cylinder is in the retracted position and the swing arm is in the closed position when the cylinder is in the extended position. In other embodiments, the actuator may be reversed whereby the swing arm is in the closed position when the cylinder is in the retracted position and the swing arm is in the open position when the cylinder is in the extended position. In another aspect, the swing arm assembly or device includes at least one mounting bracket secured to the support beam for mounting the beam to the trailer frame, so as to position the support beam within the trailer frame.

In another aspect of the present disclosure, a system for releasably securing a tarp over the opening of a trailer comprises at least two (first and second) swing arm devices or assemblies, as described above, mounted to the trailer frame at opposite ends of the frame, wherein the support beam of each of the first and second swing arm devices is disposed laterally across the opening of the trailer; and a tarp assembly comprising a flexible tarp, at least first and second resilient actuating ribs corresponding to the at least first and second swing arm devices, each actuating rib having a leading end and a trailing end, and a first rigid support coupled to a leading edge of the tarp, the leading end of each actuating rib located proximate the leading edge of the tarp. The attaching member of each of the first and second swing arm devices is adapted to releasably couple to the leading end of the corresponding actuating rib, and the tarp and the first and second actuating ribs of the tarp assembly are transversely disposed across, so as to cover, the opening of the trailer when the swing arms of the at least first and second swing arm devices are in the closed position. As well, the tarp assembly is positioned so as to hang downwardly alongside a side wall of the trailer when the swing arms of the at least first and second swing arm devices are in the open position.

In another aspect, the tarp assembly of the system may further include at least one reinforcing rib, the reinforcing rib disposed between the at least first and second swing arm devices and substantially parallel to the at least first and second actuating ribs. The at least one reinforcing rib may be positioned substantially midway between the at least first and second actuating ribs.

In another aspect, the attaching members of the at least first and second swing arm devices includes an L-shaped bracket and a mounting bracket, wherein the L-shaped bracket is pivotally coupled to the distal end of the swing arm and the mounting bracket is adapted to releasably couple to the leading end of the corresponding actuating rib of the tarp assembly.

In another aspect, the system may also include at least first and second rollers corresponding to the at least first and second actuating ribs, the first and second rollers mounted to the trailer frame adjacent to the support beam of the corresponding first and second swing arm devices so as to be in rolling contact with the actuating ribs of the tarp assembly during actuation of the first and second swing arm devices.

In some embodiments, the mounting bracket of the attaching member may be vertically offset from an outer surface of the L-shaped bracket and the outer surface of the L-shaped bracket includes a notch. The notch receives the corresponding roller when the swing arms of the at least first and second swing arm devices are in the open position.

BRIEF DESCRIPTION OF DRAWINGS

FIG. 1 is a partially exploded, partially cut-away perspective view of an embodiment of an automated tarping system according to the present disclosure, mounted onto the open top of a four sided trailer, with the swing arms in an intermediate, over-center position along their arc of rotation.

FIG. 2A is a perspective view of the embodiment shown in FIG. 1 with the tarp in the closed position.

FIG. 2B is a rear elevation view of the trailer having the tarp in the closed position shown in FIG. 2A.

FIG. 3 is a perspective view showing the swing arm of the embodiment of FIG. 1 in a nearly closed position.

FIG. 3A is an enlarged view of a portion of FIG. 3.

FIG. 6 is a perspective view of the embodiment of FIG. 1 showing the swing arms transitioning into the closed position.

FIG. 6A is an enlarged view of a portion of FIG. 6.

FIG. 8 is a perspective view of the embodiment of FIG. 1 showing the swing arms in the closed position.

FIG. 8A is an enlarged view of a portion of FIG. 8.

FIG. 12A shows an enlarged view of the attachment member of the swing arm assembly shown in FIG. 12.

DETAILED DESCRIPTION

Figure 4:
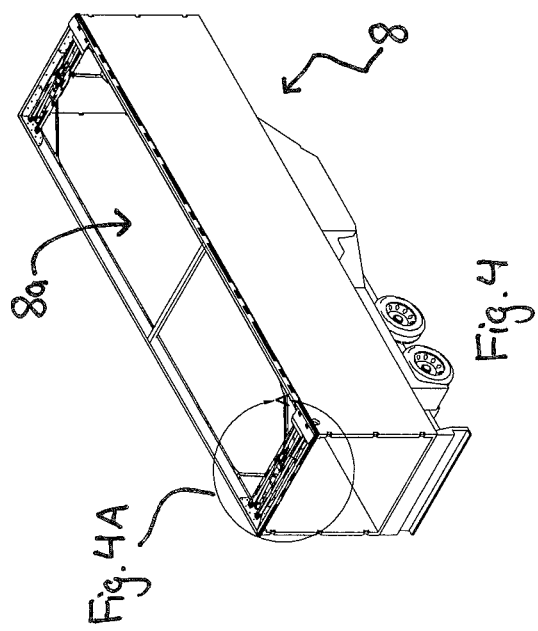
FIG. 4 is a perspective view of the embodiment of FIG. 1 showing the swing arm in a fully open position.

In one aspect of the present disclosure, an embodiment of the tarping system 10, as viewed in FIGS. 1-8, includes two swing arms 12, one mounted at each end of the upper opening 8a into four-sided trailer 8. Swing arms 12 rotate in an arc in direction A about axis of rotation B. As seen in FIG. 1, each swing arm 12 includes a proximate end 12a and a distal end 12b. The proximate end 12a of the swing arm 12 is mounted on a corresponding support beam 22. The ends of each support beam 22 are mounted on the frame 8b which defines the opening 8a into the cavity within the four walls S of the trailer 8. The ends of beams 22 may be attached by mounting brackets 22a. The distal end 12b of each swing arm 12 is coupled to attaching members 20 which are adapted to couple to the edge of a tarp T. Without intending to be limiting, each attaching member 20 may be a pivoting plate having clamping members 21 such as the rectangular small plates illustrated which bolt onto plate 20, so as to removably fasten tarp T.

As better seen in FIG. 3, system 10 further includes a moment linkage member 14 having a first end 14a and an opposite second end 14b. The first end 14a of the moment linkage member 14 is pivotally coupled to the proximate end 12a of the swing arm 12. In preferred embodiments of the present disclosure, the second end 14b of the moment linkage member 14 is pivotally coupled to both an actuator 18 and at least one damper 16. Actuator 18 has a first end 18a and an opposite second end 18b. First end 18a is pivotally coupled to the support beam 22. Second end 18b is pivotally coupled to second end 14b of the moment linkage member 14. The damper 16 has a first end 16a and an opposite second end 16b. The second end 16b of the damper 16 is pivotally connected to the second end 14b of the moment linkage member 14. The first end 16a of the damper 16 is pivotally connected to the swing arm 12, in a position along arm 12 approximately between ⅓ and ½ of the length measured from end 12a. In the preferred embodiment of the present disclosure, as best seen in FIG. 3A, the system 10 may include a parallel pair of dampers 16.

The moment linkage member 14 and actuator 18 facilitate the rotation of the swing arm 12 in direction A about axis B between a first or open and second or closed position. In the open position the tarp T is removed from covering opening 8a of trailer 8 as seen in FIG. 4. In the closed position, as seen in FIGS. 2 and 8, the tarp T is secured across the opening 8a of trailer 8. (Tarp T is removed from FIG. 8 for clarity). The system 10 includes a damper 16 so as to facilitate smooth rotation of the swing arms 12 as they cross over-center. The over-center position is when the swing arms 12 are approximately vertical. In a preferred embodiment of the present disclosure dampers 16 are used to ensure smooth operation of the swing arm 12 throughout its travel. Dampers 16 allow for compression or shortening of their length at the over-center position without binding of the linkage, and minimize jerking or flopping of the arms 12 as they go over-center. Thus a smooth acceleration/de-acceleration profile is felt by tarp T at the over-center position to thereby remove spikes in acceleration which may harm the tarp T where clamped on attachment members 20. Without intending to be limiting, the dampers 16 may, for example, be oil filled dampers or dampening cylinders. As will be appreciated by a person skilled in the art, many types of dampers or shock absorbers may be used to facilitate smoothing of the swing arm travel.

The actuator 18 and linkage 14 are adapted to facilitate the rotation of the swing arm 12 in direction A about axis B between the first position and the second position. When the tarp is to be secured over opening 8a, and thus rotation of the swing arm 12 from the first position (open position) to the second position (closed position) is required, the actuator 18 is retracted from its extended position. This results in the linkage 14 being pulled up until it reaches the end of the damper's normal stroke; in other words, not entirely extended nor retracted. Subsequently, the swing arm 12, is also pulled up in an arc towards the over-center position. In the closed position, the linkage 14 sits flush with the support beams 22 as a result of further retraction of the actuator 18, which completely retracts the dampers past their normal stroke. When the tarp is to be removed from over opening 8a, and thus rotation of the swing arm 12 from the second position (closed position) to the first position (open position) is required, the actuator 18 is, first, slightly extended to allow the dampers 16 and moment linkage 14 to pop-up from their flush position, and then actuator 18 is further extended from its retracted position resulting in the linkage 14, and the swing arm 12, being pushed back up towards the over center position.

The actuator 18, without intending to be limiting, may be an electric cylinder, hydraulic cylinder, pneumatic cylinder or screw drive. Actuator 18 may be remotely controlled, for example by using a computer controller, so as to remotely activate or automate the simultaneous rotation of the pair of swing arms 12. The control system for controlling swing arms 12 may be located in the cab of the truck, for example.

In embodiments of the present disclosure, as seen in FIG. 1, when the system 10 includes two swing arm assemblies, mounted at opposite ends of the cargo bed, a cable C may be run between the ends of the arms 12, The cable C may be mounted to the distal end 12b of each arm 12. The cable C provides additional support for the tarp as it is moved between the first and second positions; and in particular may support one longitudinally extending edge 26 of tarp T as the swing arms 12 rotate so as to smoothly convey the tarp T in direction D and in the reverse. Additionally or alternatively, an elongate pipe, tube or rod may be attached along edge 26 of the tarp T, to provide weight along edge 26 so that edge 26 falls over the opposite edge of frame Sb. Further, the tarp T may include a "window", or a section, which falls over trailer mounted scales, manufactured from transparent material, so as to allow viewing of the trailer mounted scales.

In an alternate embodiment of the present disclosure, the system may include a quick release mechanism, activated remotely, and allowing the tarp to be removed from the opening 8a of the trailer. The release mechanism separates the actuator 18 from the moment linkage member 14, so as to release the swing arms 12.

In an alternate embodiment of the present disclosure, the system includes at least two stops 24, coupled to the support beam 22, so as to stop the movement of the linkage 14 when in the closed or open positions. When in the closed or open position, the swing arms 12 sit flush with the support beams 22.

Figure 9:
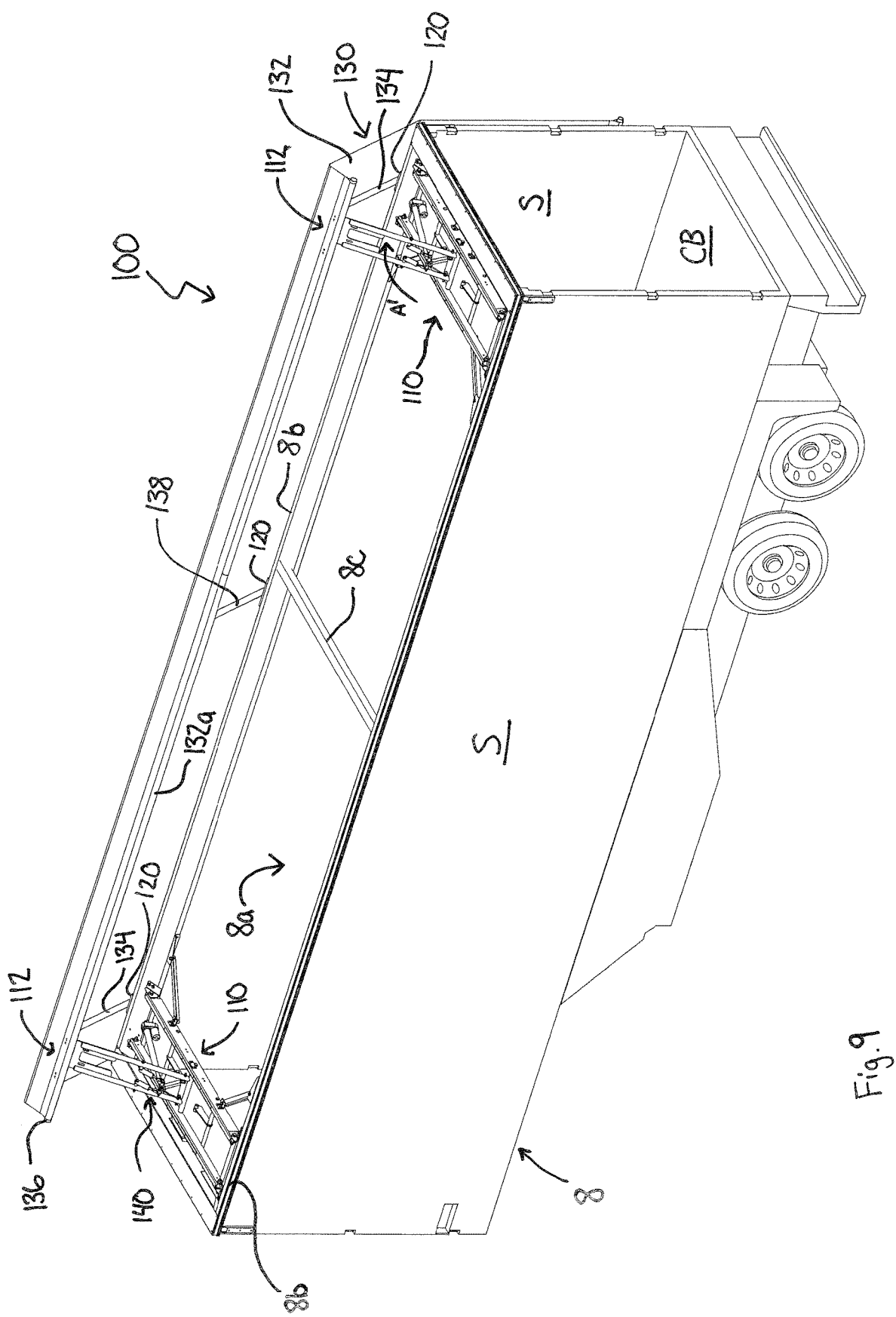
FIG. 9 is another embodiment of an automated tarping system in accordance with the present disclosure, showing the automated tarping system mounted to the frame of the trailer.

A further embodiment of the automated tarping system 100 includes two swing arm devices or assemblies 110, one at either end of the trailer frame 8b, and a tarp assembly 130, as viewed in FIGS. 9 through 15. FIG. 9 illustrates the automated tarping system 100 mounted to an upper end of the frame 8b of the trailer 8, the upper end of the frame 8b defining an opening 8a into the cargo bed CB of the trailer 8. The trailer further includes sidewalls S, defining an interior volume of the trailer 8 in which the cargo is stored. The frame of the trailer 8 may further include one or more cross members 8c.

The tarping system 100 comprises at least a pair of swing arm assemblies 110, and a tarp assembly 130. The tarp assembly 130, as best shown in FIG. 9, includes a tarp 132 manufactured of a flexible, tear-resistant, water-resistant material as is known to a person skilled in the art. The tarp assembly may advantageously further include at least first and second actuating ribs 134 and a rigid support 136, such as a rod or pole, coupled to a leading edge 132a of the tarp 132. Optionally, the tarp assembly 130 may further include one or more reinforcing ribs 138, one centrally disposed reinforcing rib 138 being illustrated, for example, in FIG. 9. The reinforcing rib or ribs 138 may be positioned so as to overlay crossmernber 8c of the trailer when the tarp assembly 130 is closed so as to cover the opening 8a of the trailer.

Each of the actuating ribs 134, rigid support 136 and reinforcing ribs 138 may be coupled to the tarp 132 in a manner known to a person skilled in the art. For example, ribs 134, 138 and support 136 may be coupled to the tarp 132 by insertion through pockets, sleeves or loops sewn into, or otherwise formed on or of, the material of the tarp 132. The ribs 134 and 138 may be manufactured of a resilient, slightly flexible material known to a person skilled in the art; for example, without intending to be limiting, the ribs 134 and 138 may be manufactured of of fibreglass or other composites, or of plastics such as Ultra High Molecular Weight (UHMW) plastic or polyethylene. The rigid support 136 may be an elongate rigid pole, tube or other elongate structure, which may be manufactured of UHMW plastic or polyethylene, composites such as fiberglass, metal or other suitably rigid materials known to a person skilled in the art. The rigid support 136 is coupled to the leading edge 132a of the tarp 132 and serves the purpose of maintaining the leading edge 132a of the tarp 132 straight and weighted, so as to hang downwardly and in front of the attachment members 112 of the swing arm assemblies 110 as the swing arms 114 are actuated between the open and closed positions.

With reference to FIGS. 10 to 15, in which the tarp 132 of the tarping assembly 130 has been removed for clarity, the details of the swing arm assemblies 110 will now be described. The swing arm assembly 110 comprises at least one swing arm 114; in a preferred embodiment, the swing arm assembly may include a pair of parallel swing arms 114. A proximate end 114a of swing arm 114 is pivotally coupled to a support beam 116 at a medial position 116a located substantially halfway along the length L of the beams 116. Preferably, swing arm 114 is pivotally coupled to and between a parallel pair of beams 116.

The swing arm assembly 110 further includes an actuator 139. A first end 139a of the actuator 139 is pivotally coupled to the support beams 116, at one end of the beams 116. A second end 139b of the actuator is operatively coupled to the swing arm 114. As used herein, the phrase "operatively coupled" is intended to refer to different embodiments of the swing arm assembly 110. For example, in one embodiment (not shown) the actuator 139 may be directly pivotally coupled to the swing arm 114 so as to move the swing arm 114 directly when the actuator 139 is actuated. In other embodiments, "operatively coupled" refers to the actuator 139 being coupled to an intermediate element which is also coupled to the swing arm, such that actuating the actuator 139 causes both the intermediate element and the swing arm to move. The intermediate element may include a plurality of linkage components such as described herein as the linkage assembly 140, best viewed in FIG. 12B.

As shown in FIGS. 10 to 15, linkage assembly 140 may include for example one or more moment linkage members 142 and one or more dampers 144. In a preferred embodiment, the linkage assembly 140 may have first and second ends 140a, 140b, wherein the first end 140a of the linkage assembly is pivotally coupled to the proximate end of the swing arm 114a and the second end 140b of the linkage assembly is pivotally coupled to the swing arm 114 at a position intermediately between the proximate and distal ends 114a, 114b of the swing arm 114, such as intermediate position 114c of the swing arm. In a preferred embodiment, the second end 139b of the actuator is pivotally coupled to the pivoting portion, such as hinge 140c, of the linkage assembly 140. The first end 140a of the linkage assembly may, in an alternative embodiment, be pivotally coupled to the cross-member 140d to which the proximate end 114a of the swing arm 114 is mounted.

Figure 10:
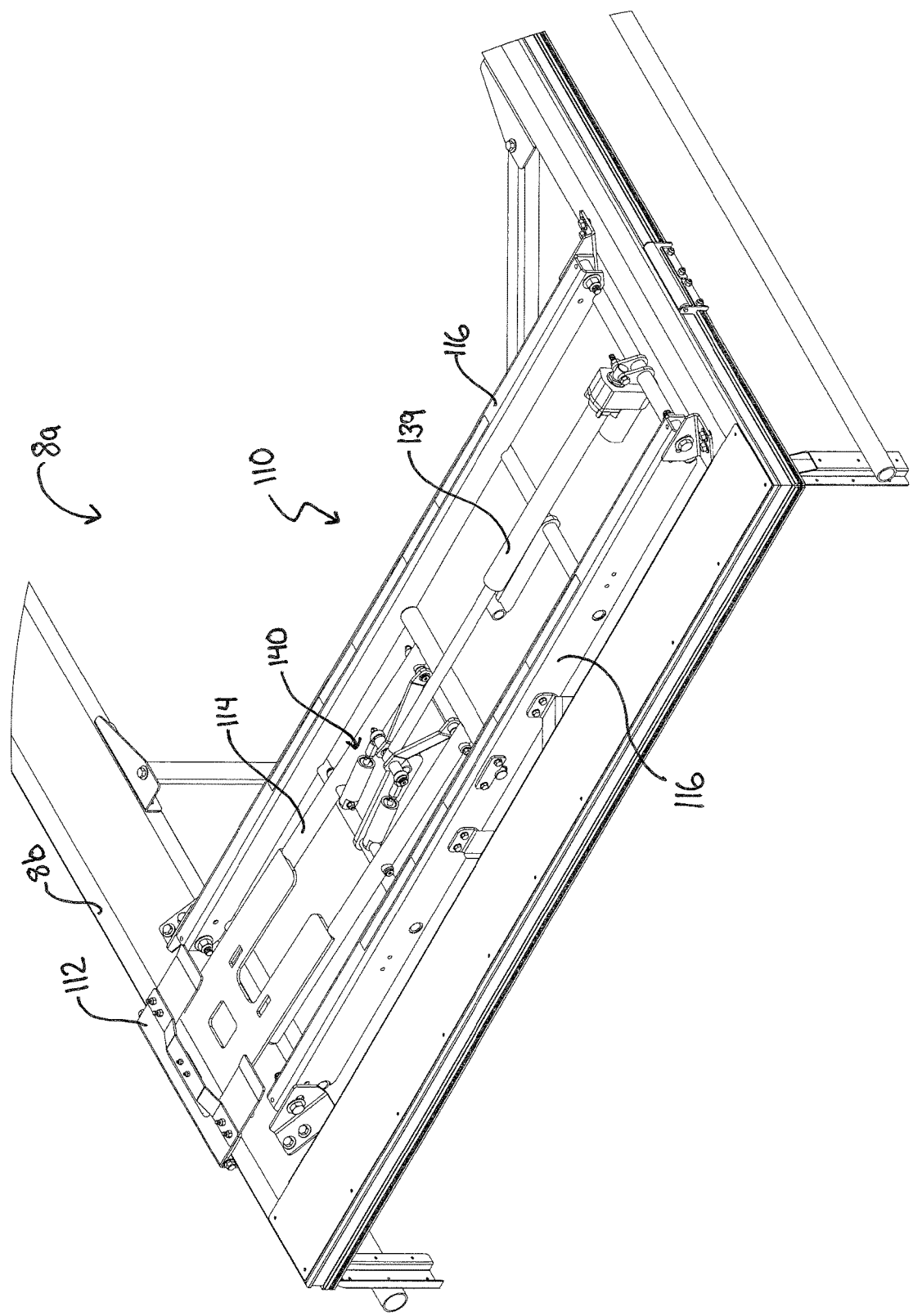
FIG. 10 shows a swing arm assembly of the embodiment of FIG. 9, illustrating the swing arm assembly in a fully closed position.
Figure 11:
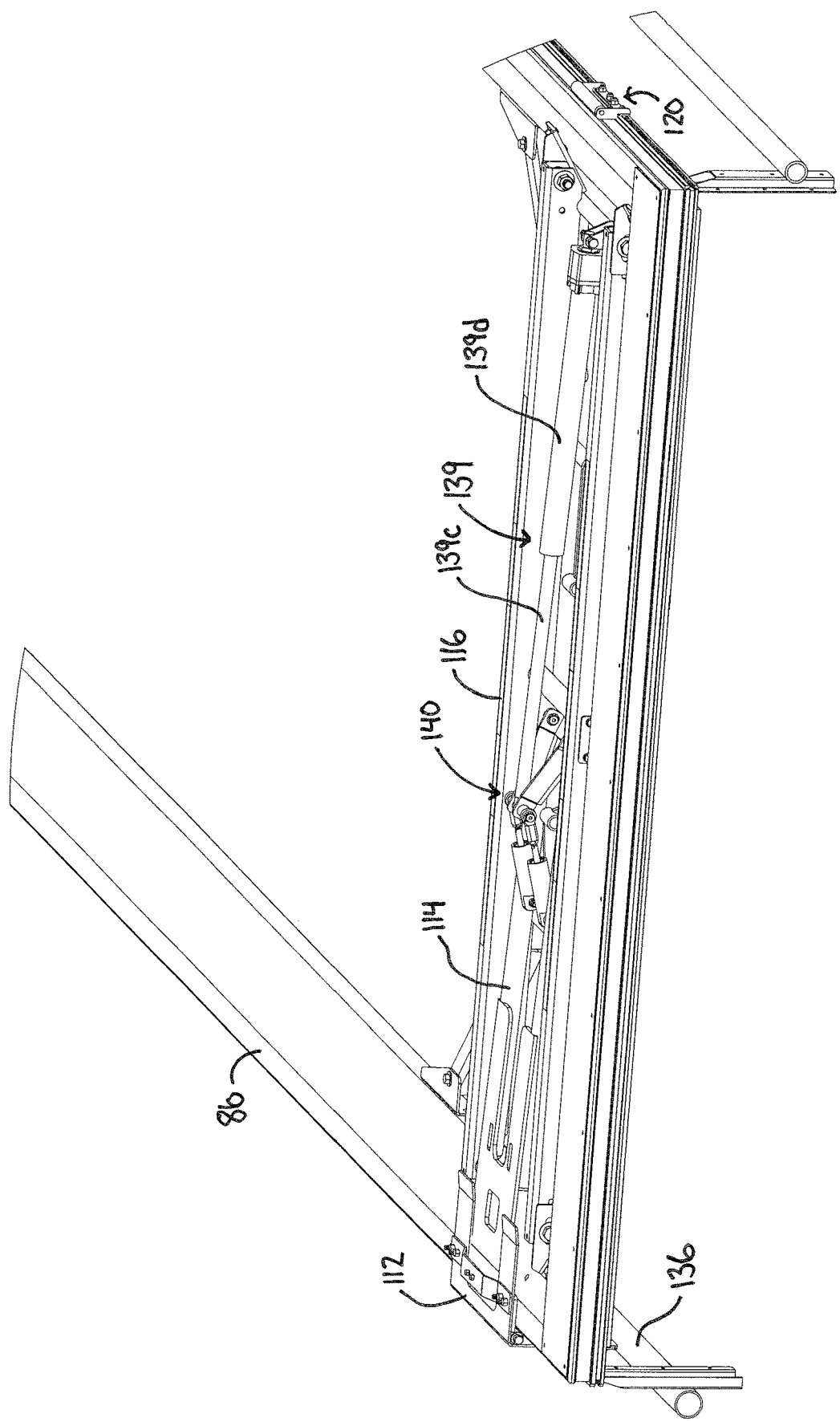
FIG. 11 shows the swing arm assembly of FIG. 10, illustrating the swing arm assembly in a fully closed position with the linkage assembly raised.
Figure 12:
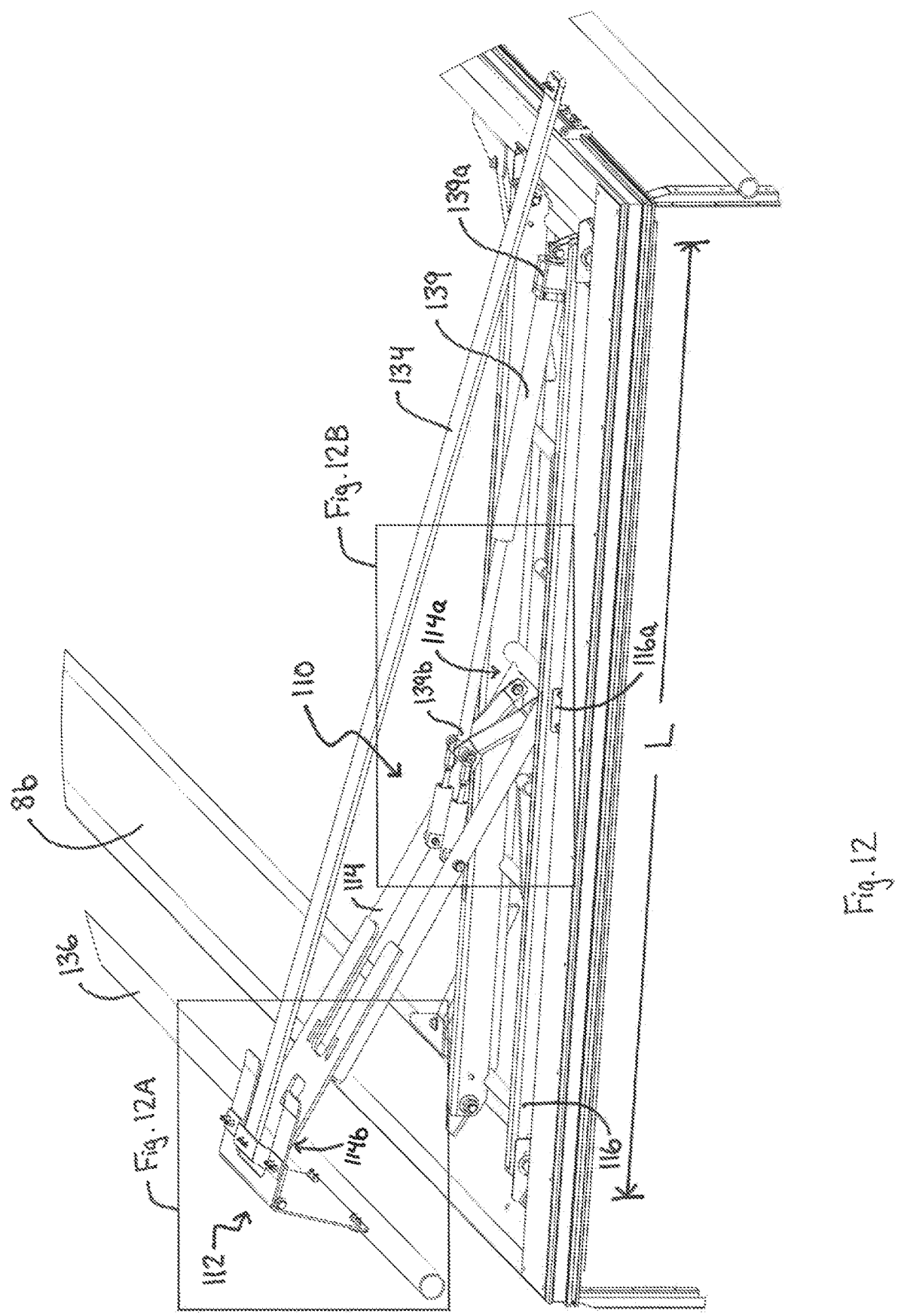
FIG. 12 shows the swing arm assembly of FIG. 10, illustrating the swing arm assembly in a partially open position.
Figure 12B:
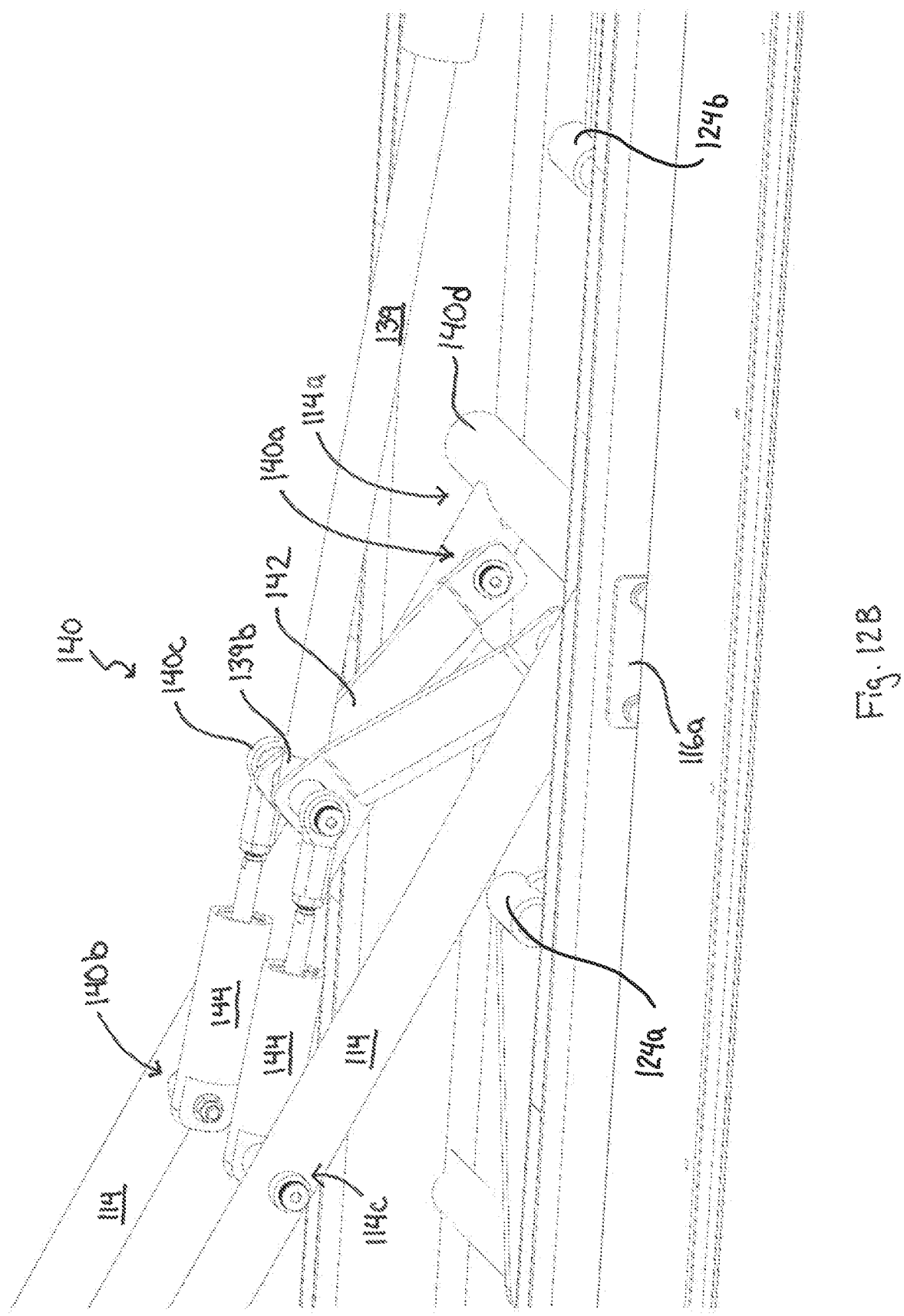
FIG. 12B shows an enlarged view of the linkage assembly of the swing arm assembly shown in FIG. 12.
Figure 13:
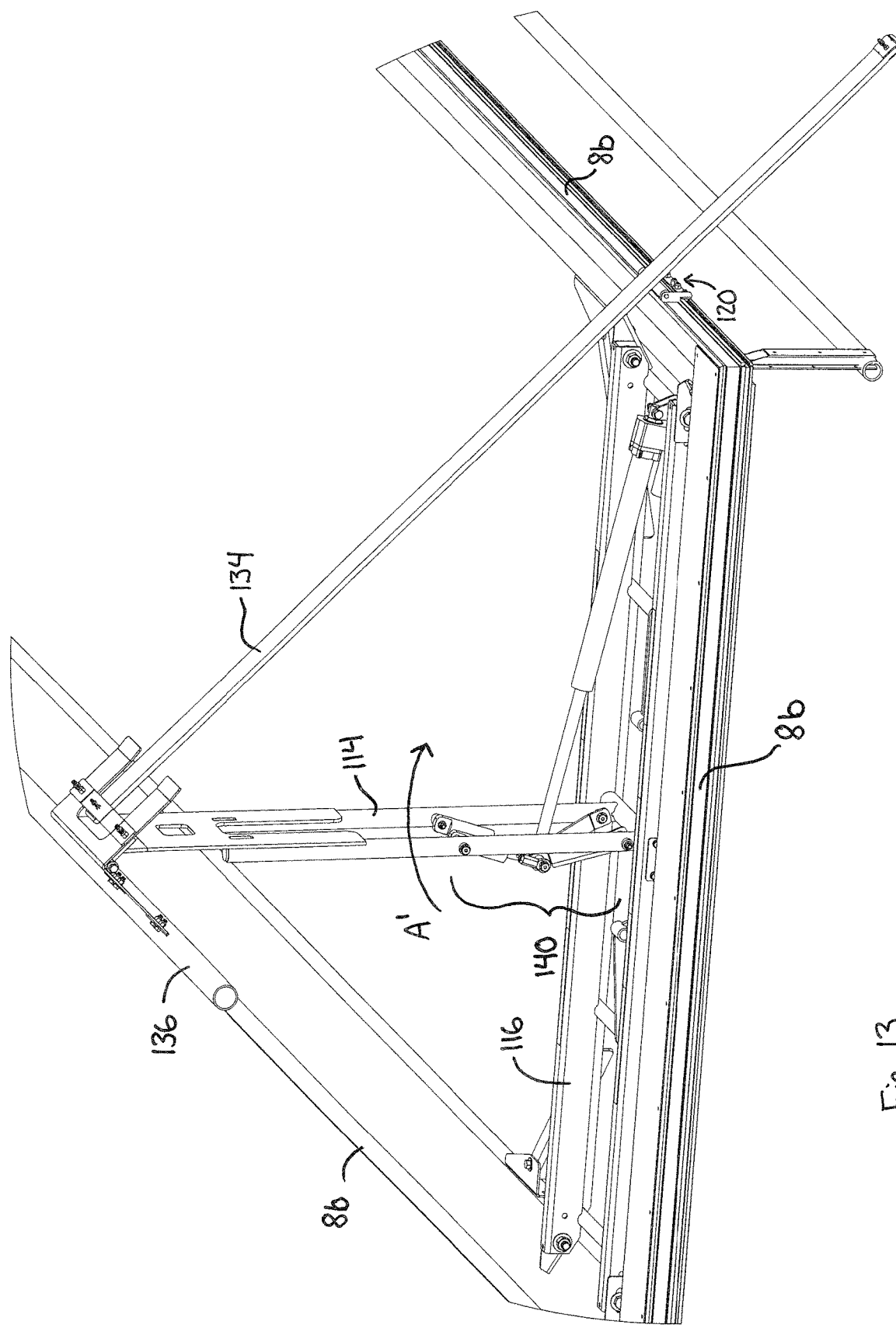
FIG. 13 shows the swing arm assembly of FIG. 10, illustrating the swing arm assembly in an intermediate position between the fully closed and open positions, with the linkage assembly past the flop point.

In the embodiment of FIG. 12B, moment linkage member 142 is pivotally coupled between the first end 140a and the hinge 140c of the linkage assembly 140, so that when actuator 139 pulls on hinge 140c as the actuator is retracted to elevate the swing arm 114, or pushes on hinge 140c as the actuator is extended to lower the swing arm 114, the moment linkage member 142 is free to rotate independently of swing arm 114 in the same manner, and to serve the same function as moment linkage member 14 in the embodiment of FIGS. 1-8. A pair of parallel dampers 144, 144 are pivotally coupled to, so as to extend between, the hinge 140c and the second end 140b of the linkage assembly 140. Advantageously, this arrangement of the linkage assembly 140 enables for a smooth transition between the opening and closing of the swing arm 114, whereby the dampers 144 bear a portion of the load as the swing arm transitions through the over-center flop point, which occurs when the swing arms 114 are in a nearly vertical position relative to the support beams 116. An example of the swing arm transitioning in direction A', at the flop point, as the swing arm is rotated to the open position, is shown in FIG. 13. Additionally, as best viewed in FIG. 12B, a pair of stops 124a, 124b are mounted to the support beam 116. Stop 124a is positioned beneath the hinge 140c of the linkage assembly 140 when in the fully closed position (as shown in FIG. 10), and stop 124b is positioned beneath the hinge 140c of the linkage assembly 140 when in the fully open position (as shown in FIG. 13). The stops 124a, 124b limit the range of motion of the linkage assembly 140 in each direction, so as to avoid overextending the linkage assembly 140 when it is in the fully closed or fully open positions. Further advantageously, the utilization of a linkage assembly 140 to operatively couple the actuator 139 to the swing arm 114 allows the swing arm assembly 110 to be recessed within the volume of the trailer 8 when the swing arm 114 is in the swing arm's closed position, such as shown in FIG. 10, as well as when the swing arm 114 is in the swing arm's open position, as shown for example in FIG. 14. As may be seen in FIGS. 10 and 11, when the swing arm 114 is in the closed position, only the attachment member 112 rests on top edge of the trailer frame 8b, while the rest of the swing arm assembly 110 is nestled between the parallel pair of support beams 116, 116. The pair of support beams 116, 116 are, themselves, mounted nestled between the opposite sides of the trailer frame 8b, beneath the top edge of frame 8b.

Figure 4A:
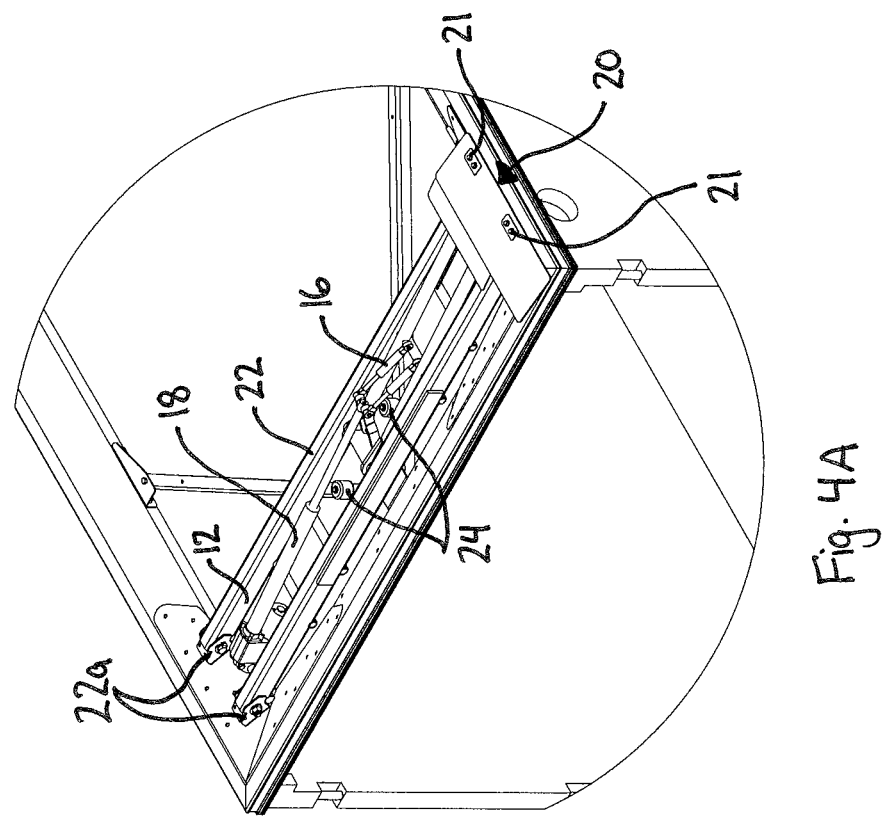
FIG. 4A is an enlarged view of a portion of FIG. 4.
Figure 5B:
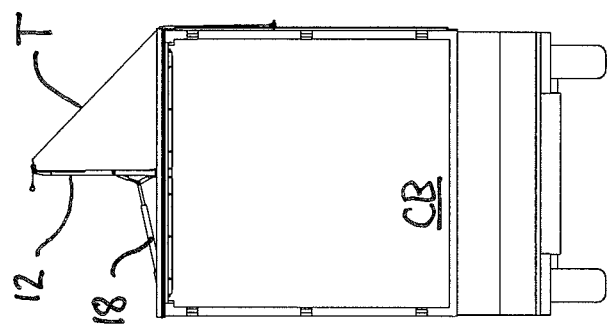
FIG. 5B is a rear elevation view of the trailer shown in FIG. 5A.
Figure 5A:
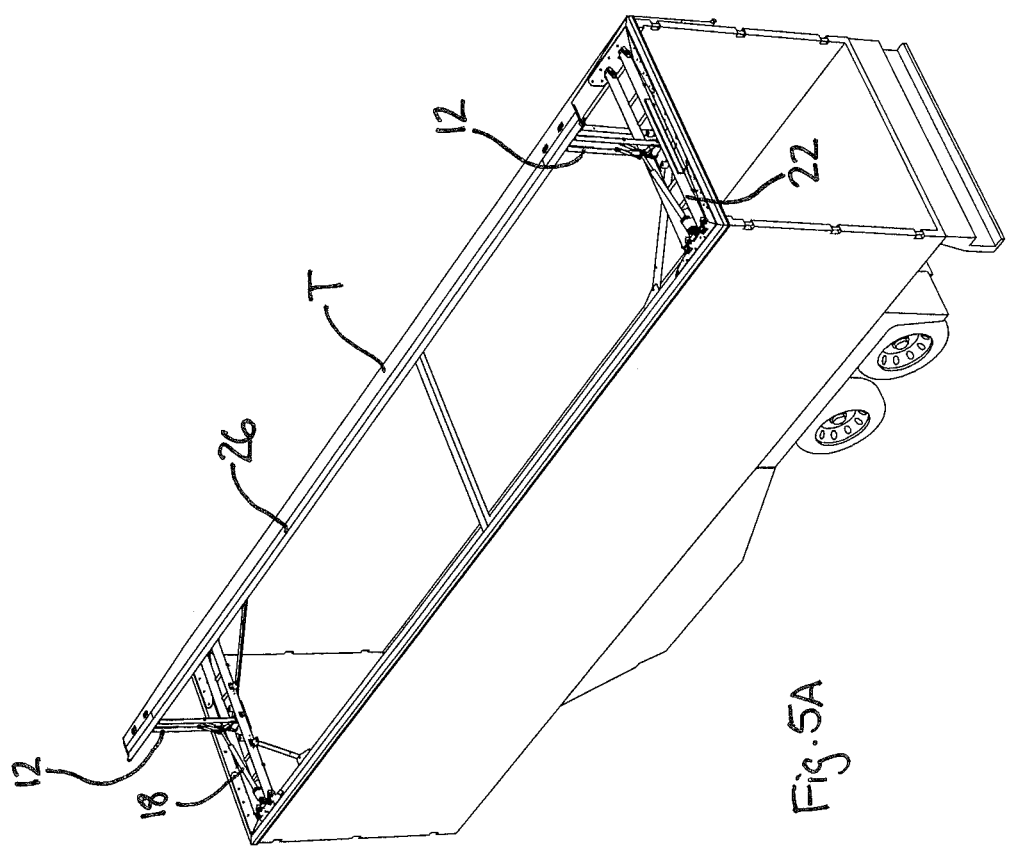
FIG. 5A is a perspective view of the embodiment of FIG. 1 showing the swing arms in an intermediate, over-center position along their arc of rotation.
Figure 7:
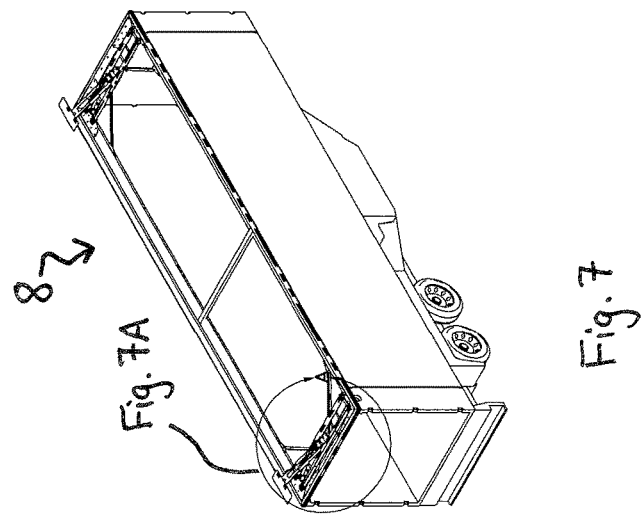
FIG. 7 is a perspective view of the embodiment of FIG. 1 showing the swing arms transitioning into the closed position.
Figure 7A:
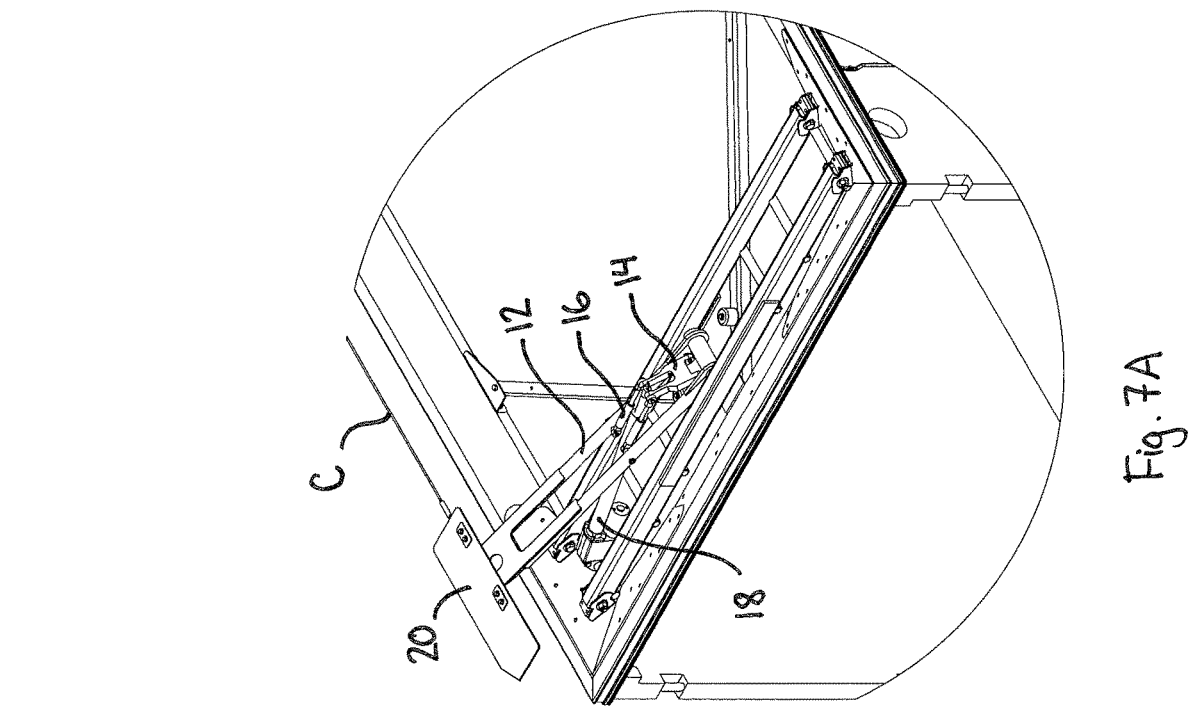
FIG. 7A is an enlarged view of a portion of FIG. 7.
Figure 14:
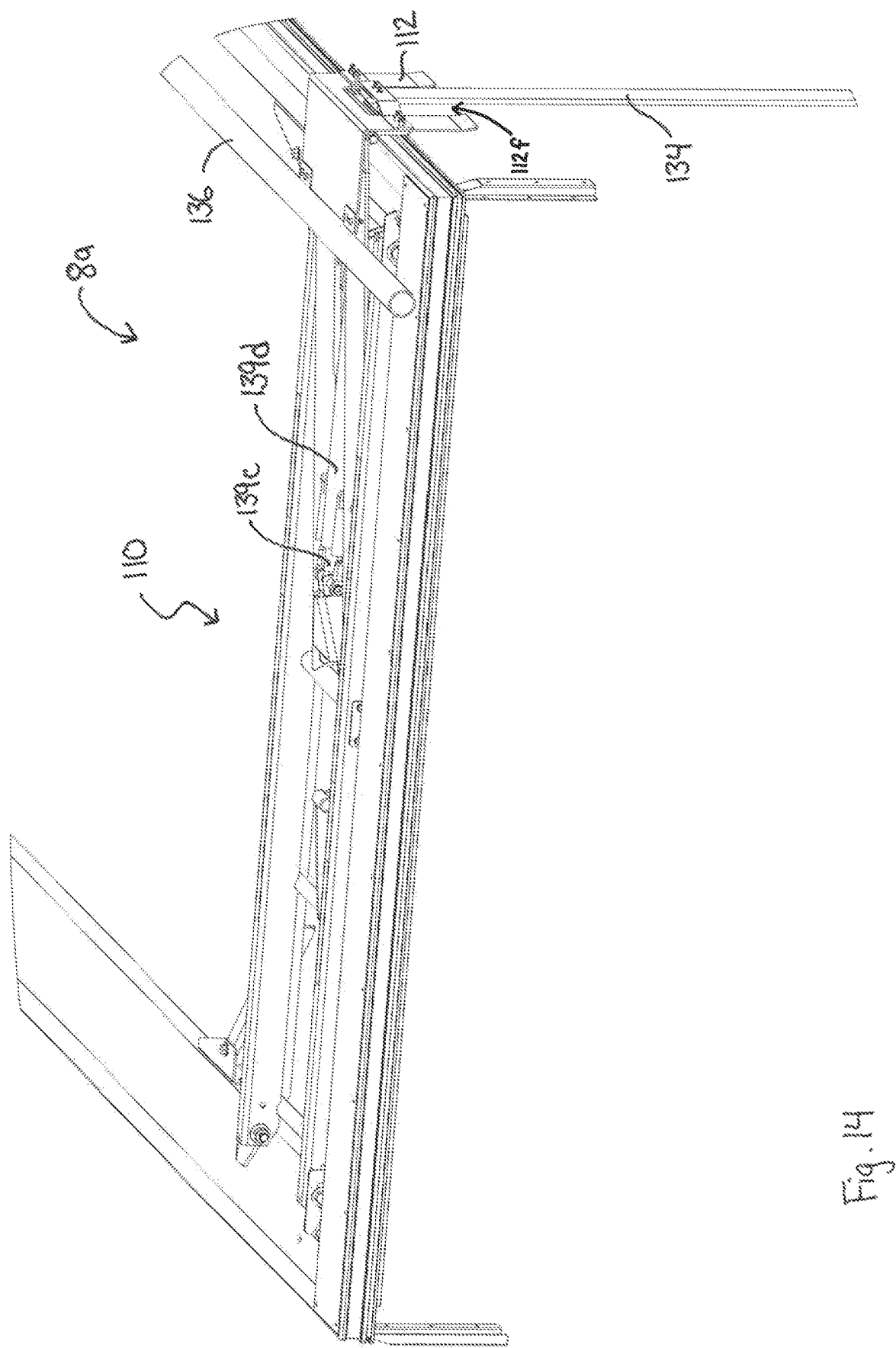
FIG. 14 shows swing arm assembly of FIG. 10, illustrating the swing arm assembly in a fully open position.
Figure 15:
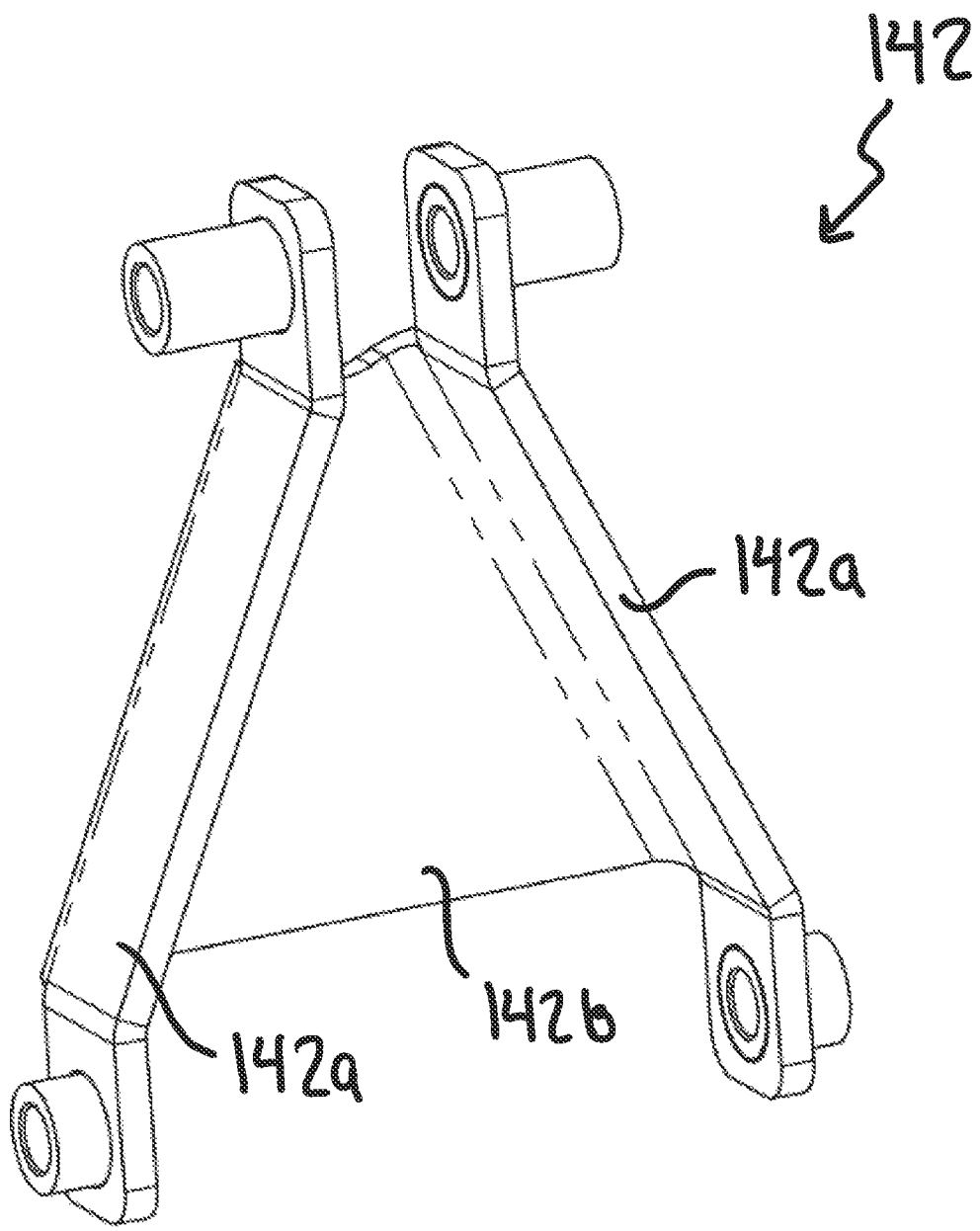
FIG. 15 shows a perspective view of the moment linkage member of the swing arm assembly of FIG. 10.

As shown in FIGS. 10 and 11, when the swing arm assembly 110 is in it's fully closed position, such that the tarp assembly 130 is covering the opening 8a of the trailer, actuator 139 is in an extended position. The actuator 139 may be any suitable linear actuator known to a person skilled in the art for actuating the swing arm 114 of the swing arm assembly 110. For example, not intending to be limiting, the actuator 139 may be a hydraulic, electrical, or pneumatic cylinder, or a screw drive. As viewed in FIG. 14, where the tarp assembly 130 is removed so as to expose the opening 8a of the trailer, the actuator 139 is in a retracted position. It will be appreciated that this arrangement of the actuator 139 within the swing arm assembly 110 differs from the embodiment described above in respect of FIGS. 1-8, whereby in that embodiment, actuator 18 is in an extended position when the tarp system 10 is an in an open position so as to remove the tarp T from the opening 8a of the trailer, as viewed in FIG. 4A. The actuator 18 is in a retracted position when the tarp system 10 is in a fully closed position, as best viewed in FIG. 8. Advantageously, reversing the actuator 139 in the embodiment illustrated in FIGS. 9-15, so that the actuator 139 is retracted when the swing arm 114 is in the open position, allows the piston 139c of the actuator to be better shielded from debris when cargo, such as wood chips, is being loaded into the opening 8a of the trailer, because the piston 139c is substantially retracted into the cylinder 139d when the swing arms 114 are in the open position, as best viewed in FIG. 14. Furthermore, there may be a mechanical advantage to the reversing of the actuator 139 in the embodiment shown in FIGS. 9 to 15 upon extension of the actuators 139 to move the swing arms 114 into the closed position. This mechanical advantage may provide additional power to initiate the actuation of the swing arm assembly from its fully open position, as shown in FIG. 14, to the closed position. Additionally, wood chips or other cargo that may land on the swing arms 114 during loading of the trailer will slide off of the swing arms and fall through the opening between the support beams 116 into the trailer when the swing arms 114 move into the closed position.

Apart from the embodiments illustrated in FIGS. 1-15, it will be appreciated by person skilled in the art that variations of the tarping system and swing arm assemblies, such as with respect to the arrangement of the actuators and the linkage assembly, are intended to be included within the scope of the present disclosure. For example, without intending to be limiting, it will be of appreciated that although the embodiments illustrated herein include a pair of parallel dampers in the linkage assemblies and a pair of parallel swing arms, a single swing arm and/or a single damper would also work and such embodiments are included in the present disclosure. As best viewed in FIG. 15, the linkage member 142 is a single element, comprising a pair of arms 142a, 142a connected to each other by a plate 142b. However, it will be appreciated that the moment linkage member 142 may include, in other embodiments, a pair of elongated arms 142a, 142a that are not connected to each other (not shown). Another possible variation includes that the actuator, such as the actuator 139 of the swing arm assembly 110, may be operatively coupled to the swing arm by a direct coupling between the actuator and the swing arm. Other possible arrangements of the linkage assembly 140 may include, for example, replacing the moment link 142 and damper 144 with a bell crank and/or rotating cam, whereby the angular motion of the bell crank and/or rotating cam is limited and the linear motion of the actuator 139 is transferred to the angular motion of the swing arm 114.

Furthermore, in embodiments which include a linkage assembly, the linkage assembly 140 may include different variations and components. For example, without intending to be limiting, it will be appreciated that for embodiments including a single swing arm, such linkage assemblies 140 may only include a single damper 144, rather than the pair of dampers that are illustrated in FIGS. 9 through 15. A further variation may include a linkage assembly including a pair of moment linkage members and a pair of dampers, which operatively couple a single actuator 139 to a single swing arm 114. It may also be appreciated that the components themselves, and the arrangement of those components, of the linkage assembly 140 may vary. For example, rather than including a single moment linkage member 142 in the linkage assembly, a linkage assembly may be configured to include a first moment linkage member 142 (or a first pair of moment linkage members 142, 142) extending from the first end 140a to the pivoting portion or hinge 140c, and a second moment linkage member 142 (or a second pair of moment linkage members 142, 142) extending from the hinge 140c to the second end 140b, substituting the pair of dampers 144, 144 that is a component of the linkage assembly 140 illustrated in FIGS. 9-15.

In a further variation of the linkage assembly 140, it will be appreciated that the damper 144 and the moment linkage member 142 may be reversed, such that the damper 144 extends between the first end 140a and the pivotal coupling or hinge 140c of the linkage assembly, and the moment linkage member 142 extends between the hinge 140c of the linkage assembly and the second end 140b of linkage assembly (not shown). It will be appreciated that the variations described above, and many other variations, of the configuration of the linkage assembly 140 may be provided so as to operatively couple the actuator 139 to an intermediate position 114c of the swing arm 114, and that all such variations are intended to be included in the scope of the present disclosure.

As shown in FIGS. 9-15, the tarp assembly 130 is releasably coupled to the swing arm assembly 110 by coupling a leading end 134a of the actuating rib 134 to the attachment member 112 of the swing arm assembly. As best viewed in FIG. 12A, illustrating a close-up view of the attachment member 112, attachment member 112 may comprise a substantially L-shaped bracket 112a pivotally coupled to the distal end 114b of the swing arm through pivotal coupling 112b. The attachment member 112 may further comprise a mounting bracket 112c, the mounting bracket 112c secured to the actuating rib 134 by suitable attachment means, for example a pair of fasteners 112d. Advantageously, the actuating rib 134 coupled to the attachment member 112 facilitates the opening and closing of the tarp 132 over the opening 8a of the trailer, as compared to an automated tarping system wherein the tarp assembly does not include actuating ribs 134, in which case there may be increased bunching of the flexible material of the tarp 132 as the swing arm assembly 110 is actuated between the open and closed positions.

Other features of the tarp assembly 130 which facilitate maintaining the tarp 132 in position during actuation of the swing arm devices 110 include the weighted rigid support 136, which rigid support 136 preferably extends along the length of the leading edge 132a of the tarp 132 and plays a role of keeping the leading edge 132a of the tarp 132 in a straight line between the two attachment members 112, 112 during the opening and closing of the tarping system 100. Although the embodiments described herein include a rigid support 136 that is an elongate member which may be, for example, a tube or a pole, it will be appreciated by person skilled in the art that other forms of rigid supports 136 coupled to the leading edge 132a of the tarp may also work to maintain the leading edge 132a in position during opening and closing procedures relative to the attachment members 112, 112 and are intended to be included within the scope of the present disclosure.

Optionally, an additional feature of the tarping system 100 may include rollers 120 mounted to the frame 8b of the trailer 8. Such rollers 120 are positioned along the frame 8b so as to be in rolling contact with each of the corresponding actuating ribs 134 of the tarp assembly 130. For example, such a roller 120 is illustrated in FIG. 13, whereby the actuating rib 134 is in rolling contact with the roller 120 so as to facilitate the sliding movement of the actuating rib 134 over the edge of the trailer 8b during actuation of the tarping system 100.

Optionally, the tarp assembly 130 may further include one or more reinforcing ribs 138 coupled to the tarp 132. In some embodiments, such reinforcing ribs 138 may be utilized to support the weight of the tarp in the mid-span portion of the tarp, the reinforcing ribs 138 located between, and parallel to, the actuating ribs 134 as viewed in FIG. 9. Such reinforcing ribs 138 may thereby provide additional support to the tarp 132 as the tarp assembly 130 is moved between an open and a closed position by the swing arm devices 110; advantageously, one or more reinforcing ribs 138 may thereby reduce or prevent the tarp 132 from sagging in the mid-span portion of tarp 132 located between the actuating ribs 134, 134. In some embodiments, the one or more reinforcing ribs 138 may be positioned proximate to a cross member 8c of the trailer frame 8b, in trailer configurations which include cross members. Further advantageously, additional rollers 120 may be mounted to the frame 8b adjacent to, so as to be in rolling contact with, the reinforcing rib 138, thereby facilitating movement of the reinforcing rib 138 over the edge of the trailer frame 8b.

Where a tarping system 100 includes rollers 120 facilitating movement of the ribs 134, 138 over the edge of frame 8b of the trailer, the mounting bracket 112c of the attachment member 112 may be designed so as to feature a vertical offset H between the L-shaped bracket 112a and the mounting bracket 112c. Furthermore, the face 112e of the L-shaped bracket 112a that is coupled to the mounting bracket 112c may include a notch 112l configured so as to receive the roper 120 when the tarp in system 100 is in an open position, as best viewed for example in FIG. 14.

What is claimed is:

1. A swing arm device for releasably securing a tarp over an opening of a trailer, the opening defined by a trailer frame of the trailer, the device comprising:
    a swing arm having a proximate end and a distal end, the proximate end of the swing arm pivotally, coupled to a support beam substantially medially along a length of the beam,
    an attaching member coupled to the distal end of the swing arm, the attaching member adapted to releasably couple to the tarp;
    an actuator having first and second ends, the first end of the actuator pivotally coupled to the support beam and the second end of the actuator operatively coupled to the swing arm between the proximate and distal ends of the swing arm;
    wherein the swing arm is adapted to rotate relative to the support beam between an open position and a closed position in which the tarp is removed from or secured over, respectively, the opening of the trailer; and
    wherein the swing arm assembly is folded within the trailer frame when the swing arm is in the open and closed positions; and
    wherein when in the closed position the swing arm is covered by the tarp.

2. The device of claim 1 further comprising a linkage assembly, the linkage assembly having first and second ends and a hinge between the first and second ends, wherein the first end of the linkage assembly is pivotally coupled to the proximate end of the swing arm, the second end of the linkage assembly is pivotally coupled to the swing arm between the proximate and distal ends of the swing arm and the second end of the actuator is pivotally coupled to the hinge of the linkage assembly.

3. The device of claim 2 wherein the linkage assembly further comprises a damper, the damper having a first end and a second end, the first end of the damper pivotally coupled to the hinge of the linkage assembly and the second end of the damper pivotally coupled to the swing arm between the distal and proximate ends of the swing arm.

4. The device of claim 3 wherein the damper is selected from a group comprising: an oil damper, a spring damper, a pneumatic damper.

5. The device of claim 1 wherein the actuator is selected from a group comprising: a hydraulic cylinder, an electric cylinder, a pneumatic cylinder, a screw drive.

6. The device of claim 1 wherein the swing arm comprises a pair of parallel swing arms.

7. The device of claim 1 wherein the actuator is a cylinder having an extended position and a retracted position, and wherein the swing arm is in the open position when the cylinder is in the retracted position and the swing arm is in the closed position when the cylinder is in the extended position.

8. The device of claim 1 wherein the actuator is a cylinder having an extended position and a retracted position, and wherein the swing arm is in the closed position when the cylinder is in the retracted position and the swing arm is in the open position when the cylinder is in the extended position.

9. The device of claim 1 wherein at least one mounting bracket is secured to the support beam for enabling the beam to be mounted to the trailer frame so as to be positioned within the trailer frame.

10. A system for releasably securing a tarp over an opening of a trailer, the system comprising:
    at least first and second swing arm devices of claim 1, wherein corresponding first and second swing arms of the at least first and second swing arm devices are pivotally mounted to corresponding first and second support beams, the first and second swing arm devices mounted to the trailer frame at opposite ends of the trailer frame, wherein the corresponding first and second support beams of each of the first and second swing arm devices are disposed laterally across the opening of the trailer,
    a tarp assembly comprising a flexible tarp, at least first and second resilient actuating ribs corresponding to the at least first and second swing arm devices, each actuating rib having a leading end and a trailing end, and a first rigid support coupled to a leading edge of the tarp, the leading end of each actuating rib located proximate the leading edge of the tarp,
    wherein the attaching member of each of the first and second swing arm devices is adapted to releasably couple to the leading end of the corresponding actuating rib, and
    wherein the tarp and the first and second actuating ribs of the tarp assembly are transversely disposed across, so as to cover, the opening of the trailer when the swing arms of the at least first and second swing arm devices are in the closed position, and wherein the tarp assembly is positioned so as to hang downwardly alongside a side wall of the trailer when the first and second swing arms of the at least first and second swing arm devices are in the open position.

11. The system of claim 10, the tarp assembly further comprising at least one reinforcing rib, the reinforcing rib disposed between the at least first and second swing arm devices and substantially parallel to the at least first and second actuating ribs.

12. The system of claim 11 wherein the at least one reinforcing rib is positioned substantially midway between the at least first and second actuating ribs.

13. The system of claim 10 wherein the attaching member of each of the at least first and second swing arm devices includes an L-shaped bracket and a mounting bracket, wherein the L-shaped bracket is pivotally coupled to the distal end of the first and second swing arms and the mounting bracket is adapted to releasably couple to the leading end of the corresponding actuating rib of the tarp assembly.

14. The system of claim 10, further comprising at least first and second rollers corresponding to the at least first and second actuating ribs, the first and second rollers mounted to the trailer frame adjacent to the first and second support beams of the corresponding first and second swing arm devices so as to be in rolling contact with the first and second actuating ribs of the tarp assembly during actuation of the first and second swing arm devices.

15. The system of claim 14 wherein the mounting bracket of the attaching member is vertically offset from an outer surface of the L-shaped bracket and the outer surface of the L-shaped bracket includes a notch, wherein the notch receives the corresponding roller when the swing arms of the at least first and second swing arm devices are in the open position.

16. The device of claim 2 further comprising first and second stops, the first and second stops mounted to the support beans and spaced apart from one another along the beam so as to limit a range of motion of the swing arm, wherein when the swing arm is in the open position the linkage assembly rests on the first stop and when the swing arm is in the closed position the linkage assembly rests on the second stop.

* * * * *